US010500496B2

(12) United States Patent
Clark et al.

(10) Patent No.: US 10,500,496 B2
(45) Date of Patent: Dec. 10, 2019

(54) PHYSICAL OBSTACLE AVOIDANCE IN A VIRTUAL REALITY ENVIRONMENT

(71) Applicant: International Business Machines Corporation, Armonk, NY (US)

(72) Inventors: Adam T. Clark, Mantorville, MN (US); Jeffrey K. Huebert, Rochester, MN (US); Aspen L. Payton, Byron, MN (US); John E. Petri, St. Charles, MN (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 4 days.

(21) Appl. No.: 15/870,536

(22) Filed: Jan. 12, 2018

(65) Prior Publication Data

US 2019/0217198 A1 Jul. 18, 2019

(51) Int. Cl.
| | |
|---|---|
| A63F 13/54 | (2014.01) |
| H04S 7/00 | (2006.01) |
| G06T 19/00 | (2011.01) |
| G06K 9/62 | (2006.01) |
| G06K 9/00 | (2006.01) |

(52) U.S. Cl.
CPC .......... A63F 13/54 (2014.09); G06K 9/00671 (2013.01); G06K 9/6293 (2013.01); G06T 19/003 (2013.01); H04S 7/303 (2013.01)

(58) Field of Classification Search
None
See application file for complete search history.

(56) References Cited

U.S. PATENT DOCUMENTS

| | | |
|---|---|---|
| 2010/0164953 A1 | 7/2010 | Wouhaybi et al. |
| 2012/0229508 A1* | 9/2012 | Wigdor .................. G06F 3/147 345/633 |
| 2012/0264510 A1 | 10/2012 | Wigdor |
| 2013/0002425 A1 | 1/2013 | Hatch et al. |
| 2016/0148433 A1 | 5/2016 | Petrovskaya |
| 2016/0189426 A1 | 6/2016 | Thomas |
| 2017/0068508 A1 | 3/2017 | Crieri et al. |
| 2017/0173454 A1 | 6/2017 | Begum et al. |
| 2017/0228922 A1 | 8/2017 | Kaeser et al. |

(Continued)

FOREIGN PATENT DOCUMENTS

| | | |
|---|---|---|
| CN | 105893928 A | 8/2016 |
| CN | 106139587 A | 11/2016 |
| WO | 2016079474 A1 | 5/2016 |

OTHER PUBLICATIONS

IBM: List of IBM Patents or Patent Applications Treated as Related, 2 pg.

(Continued)

Primary Examiner — Peter Hoang
(74) Attorney, Agent, or Firm — Cuenot, Forsythe & Kim, LLC

(57) ABSTRACT

While a virtual reality environment is being presented to a user, at least a first sound in a real world environment in which the user physically is located can be detected. a nature of the first sound can be determined. Based on the nature of the first sound, a second sound that matches a theme of the virtual reality environment can be selected. The first sound can be masked by presenting the second sound to the user in the virtual reality environment.

20 Claims, 10 Drawing Sheets

(56) References Cited

U.S. PATENT DOCUMENTS

| | | | |
|---|---|---|---|
| 2017/0236149 A1* | 8/2017 | Christensen | G11B 27/11 345/156 |
| 2018/0020312 A1 | 1/2018 | Visser et al. | |
| 2018/0046864 A1 | 2/2018 | Flint et al. | |
| 2018/0190022 A1 | 7/2018 | Zamir | |
| 2019/0051051 A1 | 2/2019 | Kaufman et al. | |

OTHER PUBLICATIONS

Clark, A.T. et al., "Physical Obstacle Avoidance in a Virtual Reality Environment", U.S. Appl. No. 15/870,501, filed Jan. 12, 2018, 49 pages.

Volpe, J., "HTC's making virtual reality safe for the home with Chaperone," [online] Engadget, Oath Tech Network AOL Tech © 2018, Jan. 5, 2016 [retrieved Jan. 11, 2018], retrieved from the Internet: <https://www.engadget.com/2016/01/05/htc-vive-virtual-reality-chaperone/>, 5 pg.

"VIVE™, Discover Virtual Reality Beyond Imagination," [online] HTC Corporation © 2011-2018 [retrieved Nov. 28, 2017], retrieved from the Internet: <https://www.vive.com/us/>, 5 pg.

"Oculus," [online] Oculus VR, LLC © 2017 [retrieved Nov. 28, 2017], retrieved from the Internet: <https://www.oculus.com/en-us/>, 5 pg.

"PlayStation VR," [online] Sony Interactive Entertainment LLC © 2017 [retrieved Nov. 28, 2017], retrieved from the Internet: <https://www.playstation.com/en-us/explore/playstation-vr/>, 8 pg.

"Selective Audio Control for Sound Sources in a Volumetric Display," [online] IP.Com Prior Art Database Technical Disclosure No. IPCOM000238801D, Sep. 18, 2014, 4 pg.

\* cited by examiner

US 10,500,496 B2

PHYSICAL OBSTACLE AVOIDANCE IN A VIRTUAL REALITY ENVIRONMENT

BACKGROUND

The present invention relates to data processing systems and apparatuses used for virtual reality.

Virtual reality (VR) is a computer-generated simulation of a three-dimensional image or environment with which a user can interact in a seemingly real way using special electronic equipment, for example a VR headset. A VR headset is a head-mounted apparatus having one or more screens positioned in front of the user's eyes. A VR headset also may include one or more motion tracking sensors that track movement of the user's head, which allows the user to explore the VR image/environment by moving his/her head. VR headsets are widely used with computer games, but they can be used in other applications including simulators and trainers.

SUMMARY

A method includes, while a virtual reality environment is being presented to a user, detecting at least a first sound in a real world environment in which the user physically is located. The method also can include determining, using a processor, a nature of the first sound. The method also can include, based on the nature of the first sound, selecting a second sound that matches a theme of the virtual reality environment and masking the first sound by presenting the second sound to the user in the virtual reality environment.

An apparatus includes a processor programmed to initiate executable operations. The executable operations include, while a virtual reality environment is being presented to a user, detecting at least a first sound in a real world environment in which the user physically is located. The executable operations also can include determining a nature of the first sound. The executable operations also can include, based on the nature of the first sound, selecting a second sound that matches a theme of the virtual reality environment and masking the first sound by presenting the second sound to the user in the virtual reality environment.

A computer program product includes a computer readable storage medium having program code stored thereon. The program code is executable by a data processing system to initiate operations. The operations include, while a virtual reality environment is being presented to a user, detecting at least a first sound in a real world environment in which the user physically is located. The operations also can include determining a nature of the first sound. The operations also can include, based on the nature of the first sound, selecting a second sound that matches a theme of the virtual reality environment and masking the first sound by presenting the second sound to the user in the virtual reality environment.

DETAILED DESCRIPTION

Figure 1:
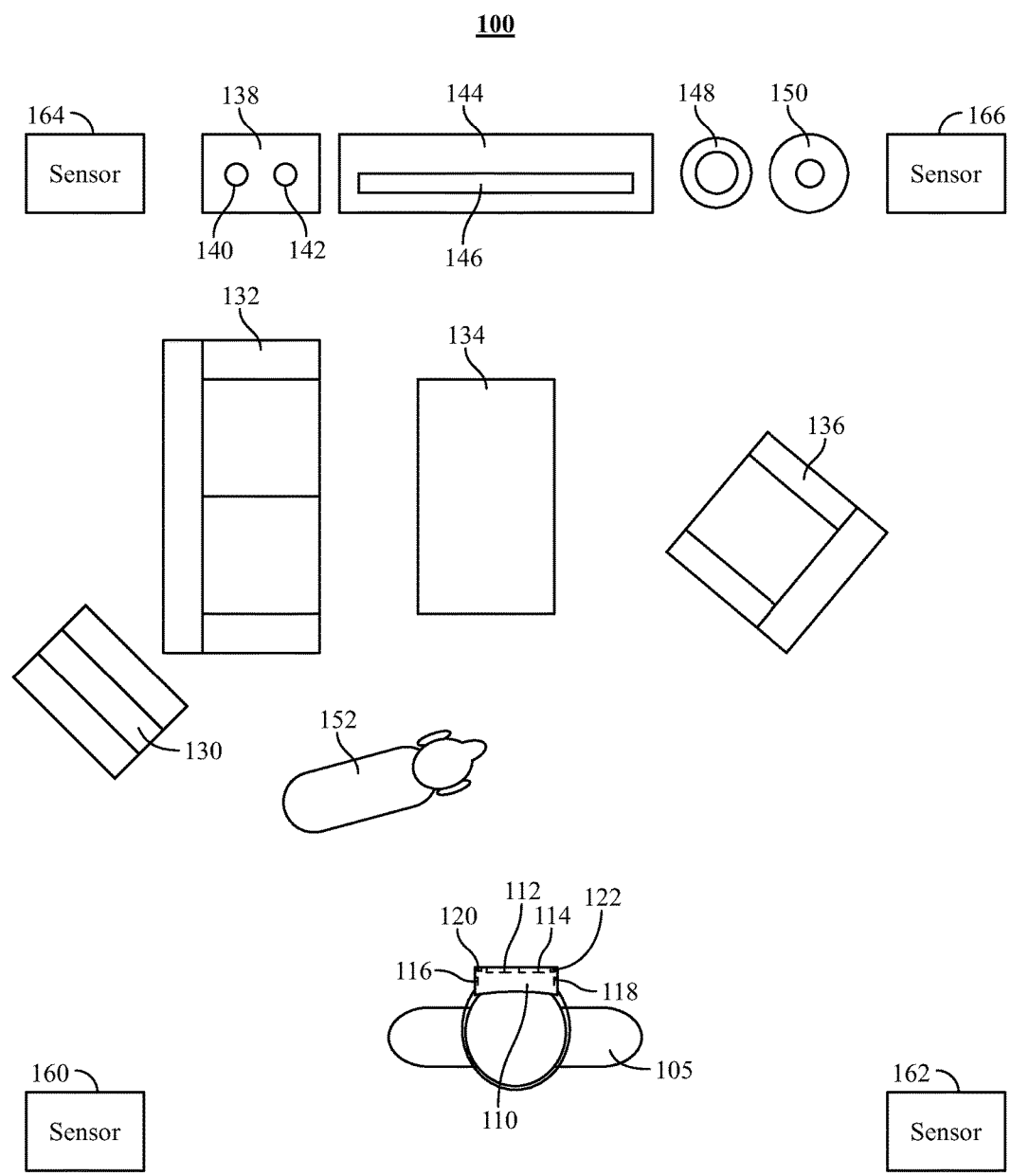
FIG. 1 is a diagram depicting an example of a real world environment.

This disclosure relates to data processing systems and apparatuses used for virtual reality (VR). In accordance with the inventive arrangements disclosed herein, a user can interact with a VR environment using at least one VR apparatus (e.g., a VR headset). The user can interact with the VR environment while being present in a real world environment, such as a room, a series of rooms, a structure, a field, etc. While interacting in with the VR environment, the user may not be able to see physical objects present in the real world environment. For example, the user's eyes may be covered by a VR headset. Nonetheless, while interacting with the VR environment, the user may be moving in the real world environment. Thus, there is a risk the user will bump into various physical objects, which can result in injury to the user becoming and/or damage to the physical objects. The present arrangements can mitigate the risk of such happenstances.

Specifically, the VR apparatus, or one or more data processing systems and/or gaming controllers to which the VR apparatus is communicatively linked, can detect physical objects located in the real world environment in which the user physically is located. The VR apparatus, or one or more data processing systems and/or gaming controllers to which the VR apparatus 110 is communicatively linked, can determine, in real time, real world environment coordinates of where the physical objects are located relative to the user in the real world environment. The real world environment coordinates can be updated, in real time, as the user moves about the real world environment.

Further, the VR apparatus, or one or more data processing systems and/or gaming controllers to which the VR apparatus is communicatively linked, can present, in the VR environment, virtual objects. The virtual objects can be placed in the VR environment at virtual coordinates, relative to a virtual representation of the user in the VR environment, corresponding to the determined real world environment coordinates of where the physical objects are located relative to the user in the real world environment. For example, if a real world object is a stationary object, such as a couch or table, the VR apparatus can present in the VR environment a virtual object that is stationary, such as a rock, a plant (e.g., a cactus or rose bush), a hole in the ground, etc. Accordingly, the user will know not to traverse such virtual object in the VR environment, thus mitigating the risk of the user bumping into the physical object in the real world environment.

In some cases, a real world object may be configured to withstand the weight of the user. In such cases, a virtual object which the user may stand on may be placed in the VR environment at the virtual coordinates. For example, steps in the real world, or a table in the real world designed to support the weight of the user, can be represented in the VR environment as steps or stepping stones. One or more dimensions of the steps or stepping stones can be configured to correspond to one or more dimensions of the physical object, thus enabling the user to move about in the real world environment, without tripping, while viewing the VR environment via the VR apparatus.

In addition, various arrangements described herein further enhance the user's VR experience, for example by masking sounds emanated by various physical objects, including pets, aircraft, etc. The sounds can be masked by generating sounds that fit the VR environment in which the user is participating. In some arrangements, moving virtual objects can be presented in the VR environment to represent other physical objects that are moving in the real world. The various arrangements are described herein in further detail.

The various arrangements described herein also can be used for augmented reality (AR) in an AR environment, for example using at least one AR apparatus.

Several definitions that apply throughout this document now will be presented.

As defined herein, the term "real world" means the physical world in which human beings and other physical objects physically exist.

As defined herein, the term "real world environment" means a portion of the real world, for example a room, a series of rooms, a structure, a building, a field, and so on.

As defined herein, the term "virtual reality environment" means a computer-simulated environment (e.g., a virtual world), visually represented by three-dimensional images, in which at least one user virtually inhabits, using a virtual representation of the user, in a seemingly real way using special electronic equipment (e.g., a VR headset, data processing system, gaming controller, etc.). An example of a virtual reality environment is an environment presented by a virtual reality game, simulator or trainer. A map presented by a navigation system, simulator or trainer representing the real world is not a "virtual reality environment" as the term "virtual reality environment" is defined herein.

As defined herein, the term "augmented reality environment" is a live direct or indirect view of a physical, real world, environment whose elements are augmented with virtual objects and/or sounds generated by a data processing system.

As defined herein, the term "virtual object" means an object generated by a data processing system that is presented in a virtual reality environment or augmented reality environment.

As defined herein, the term "physical object" means an object physically present in the real world.

As defined herein, the term "virtual reality apparatus" means an apparatus configured to present a virtual reality environment to a user. A "virtual reality apparatus" also may detect and/or monitor user inputs and/or user movements.

As defined herein, the term "augmented reality apparatus" means an apparatus configured to present an augmented reality environment to a user. An "augmented reality apparatus" also may detect and/or monitor user inputs and/or user movements.

As defined herein, the term "mask" means audibly disguise.

As defined herein, the term "audio stereo imaging effect" means an effect produced by selectively controlling audio output by a plurality of output audio channels, the effect causing a sound produced by the plurality of output audio channels to appear to be emanating from a particular spatial location at a particular point in time. An audio stereo imaging effect can cause a location from which the sound appears to be emanating to spatially move over time.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "output" means storing in memory elements, writing to display or other peripheral output device, sending or transmitting to another system, exporting, or similar operations.

As defined herein, the term "user" means a person (i.e., a human being).

FIG. 1 is a diagram depicting an example of a real world environment 100. A user 105 can be present in the real world environment 100 and using a virtual reality (VR) apparatus 110 or an augmented (AR) apparatus. Hereinafter, reference will be made to a VR apparatus 110, but it will be understood by those skilled in the art that an AR apparatus can be used in lieu of a VR apparatus, and an AR apparatus can be configured similarly to the VR apparatus described herein. The VR apparatus 110 can be, for example, a VR headset worn by the user. The VR apparatus 110 can include at least one display 112, 114 positioned in front of the user's eyes. In this regard, the at least one display 112, 114 can be a mobile VR display.

Optionally, the VR apparatus 110 can include at least one output audio transducer 116, 118, for example electroacoustic transducers, that convert an electrical audio signals into a corresponding audible sounds detectable by the user 105. The output audio transducer(s) 116, 118 can be components of the VR apparatus 110, or communicatively linked to the VR apparatus 110, or another gaming device or data processing system to which the VR apparatus 110 is communicatively linked. For example, the output audio transducer(s) 116, 118 can be components of headphones and/or loudspeakers communicatively linked via one or more communication ports and/or audio output ports to the VR apparatus 110, or a gaming device or data processing system to which the VR apparatus 110 is communicatively linked.

Optionally, the VR apparatus 110 can include at least one sensor 120, 122 that detects physical objects 130, 132, 134, 136, 138, 140, 142, 144, 146, 148, 150, 152 present in the real world environment 100 and their locations in the real world environment 100, for example the locations of the physical objects 130-152 relative to a current location of the user 105. The at least one sensor 120, 122 can output, in real time, sensor data corresponding to the shape/spatial dimensions of the physical objects 130-152 and the locations of the physical objects 130-152 in the real world environment 100. In illustration, if the user 105 is wearing the VR apparatus 110, the at least one sensor 120, 122 of the VR apparatus 110 can output, in real time, sensor data indicating the current locations of the physical objects 130-152 in the real world environment 100 relative to the current location of the VR apparatus 110, as well as movement of the VR apparatus 110, and thus the user 105, within the real world environment 100.

As the user 105 moves about the real world environment 100 wearing the VR apparatus 110, the output sensor data can dynamically change, in real time, to reflect the current locations of the physical objects 130-152 relative to the current location of the VR apparatus 110, regardless of whether the physical objects 130-152 themselves have moved. In this regard, some physical objects 130-150 may be stationary in the real world environment 100, while other physical objects 152, such as pets, other people, etc., may move. Nonetheless, the sensor data can indicate, at any point in time (or any particular time frame), current locations of the physical objects 130-152 relative to the current location of the VR apparatus 110.

The sensor data also can indicate in real time, for each physical object 130-152, whether the physical object 130-152 moves and/or any generated sounds. If a physical object moves, for example the physical object 152, the sensor data can indicate such movement. If a physical object 130-152 generates an acoustic signal (i.e., sound), the sensor data can indicate such acoustic signal.

Optionally, in addition to, or in lieu of, the one or more sensors 120, 122, one or more sensors 160, 162, 164, 166 can be located within the real world environment 100. The sensors 160-166 can output data, in real time, indicating current locations of the physical objects 130-152, as well as the current location of the user 105, within the real world environment 100 at any point in time (or any particular time frame). The one or more sensors 160-166 also can indicate, in real time, movement of one or more of the physical objects 130-152, as well as movement of the VR apparatus 110 and user 105, in the real world environment 100. Further, one or more of the sensors 160-166 can indicate any acoustic signals (i.e. sounds) generated by one or more of the physical objects 130-152.

In one arrangement, the sensors 160-166 can output the sensor data to the VR apparatus 110 via one or more wired communication links (e.g., Ethernet and/or Internet communication links) and/or one or more wireless communication links, such as IEEE 802 wireless communication links and/or personal area network (PAN) communication links. An example of an IEEE 802 communication link is an IEEE 802.11 communication link (e.g., WiFi™). An example of a PAN communication link is a Bluetooth® communication link. The present arrangements, however, are not limited to these examples. In another arrangement, the sensors 160-166 can output the sensor data, using one or more wired and/or wireless communication links, to at least one data processing system (e.g., a computer) and/or one or more gaming controllers to which the VR apparatus 110 is communicatively linked using one or more wired and/or wireless communication links. In one non-limiting arrangement, a gaming controller need not be limited to a traditional gaming controller device, but instead a gaming controller can include sensors that track movements of the user 105. Such a gaming controller can track the user's movements, for example, the user walking around, moving hands, talking, etc. as the user interacts with a VR environment.

As noted, the sensors 120, 122, 160-166 can be configured to generate sensor data indicating the location of physical objects 130-152 in the real world environment 100, the shape/spatial dimensions of the physical objects 130-152 and/or sounds generated by the physical objects 130-152. In this regard, the sensors 120, 122, 160-166 can include one or more cameras, one or more infrared (IR) sensors, one or more input audio transducers, and/or any other sensors suitable for detecting shape/spatial dimensions, movement and/or sound, and the present arrangements are not limited in this regard.

Figure 2:
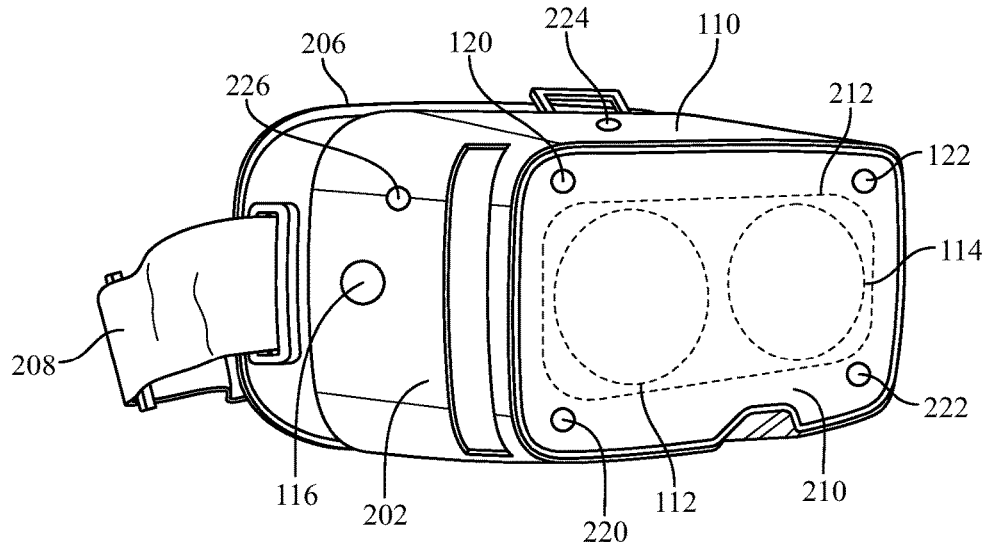
FIG. 2 is a diagram illustrating an example of a virtual reality (VR) apparatus.

FIG. 2 is a diagram illustrating an example of a VR apparatus 110. The VR apparatus 110 can include a case 202 (e.g., shell). In one non-limiting arrangement, the case 202 can be configured to be worn on a head of the user 105. For example, a rear portion 206 of the case 202 can be configured to comfortably fit on a face of the user 105 and cover the eyes of the user 105. The VR apparatus 110 can include one or more straps 208 to hold the VR apparatus 110 in place over the eyes.

As noted, the VR apparatus 110 can include at least one display 112, 114. The displays 112, 114 can be mounted to a front portion 210 of the case 202 to present images toward the eyes of the user 105. The interior of the case 204 can include at least one aperture through which the user can view images and/or video presented by the displays 112, 114. In one arrangement, the VR apparatus 110 can include the first display 112 positioned in front of a first eye of the user 105 and the second display 114 positioned in front of a second eye of the user 105. The case 202 can include respective apertures for each display 112, 114, thus enable each eye to view a respective display 112, 114 through the respective apertures. Use of the displays 112, 114 can facilitate presentation of three-dimensional images to the user 105, as is known to those skilled in the art. In another arrangement, in lieu of the displays 112, 114, the VR apparatus 110 can include a single display 212 positioned in front of both the first and second eyes of the user 105. Nonetheless, different portions of the display 212 can be configured to present different perspectives of the images to the respective eyes, for example through respective apertures, thus facilitating presentation of three-dimensional images to the user 105.

In one aspect of the present arrangements, the sensor 120 can be an image sensor (e.g. camera) and the sensor 122 can be an input audio transducer. The VR apparatus 110, or one or more data processing systems and/or gaming controllers to which the VR apparatus 110 is communicatively linked, can determine which physical object 130-152 generates a sound based on data generated by correlating a movement of a physical object 130-152 (e.g., movement of a pet's mouth) with a detected sound.

In another aspect of the present arrangements, the sensors 120, 122 can be image sensors that generate image sensor data that may be processed by the VR apparatus 110, or one or more data processing systems and/or gaming controllers to which the VR apparatus 110 is communicatively linked, to generate stereoscopic image data. Based on the stereoscopic image data, the VR apparatus 110, or one or more data processing systems and/or gaming controllers to which the VR apparatus 110 is communicatively linked, can determine the shape/spatial dimensions of the various physical objects, such as the physical objects 130-152 of FIG. 1.

In addition to the sensors 120, 122, the VR apparatus 110 can include one or more additional sensors 220, 222, 224, 226. The sensors 220, 222 can be input audio transducers that generate audio sensor data that may be processed by the VR apparatus 110, or one or more data processing systems and/or gaming controllers to which the VR apparatus 110 is communicatively linked, to generate stereo audio data. Based on the stereo audio data, the VR apparatus 110, or one or more data processing systems and/or gaming controllers to which the VR apparatus 110 is communicatively linked, can determine the direction, relative to the VR apparatus 110, from which an acoustic signal (i.e., sound) is generated. The VR apparatus 110, or one or more data processing systems and/or gaming controllers to which the VR apparatus 110 is communicatively linked, can process such data along with the image data to determine which physical object 130-152 generated the sound. In the case that a plurality of the physical objects 130-152 generate sound, the VR apparatus 110, or one or more data processing systems and/or gaming controllers to which the VR apparatus 110 is communicatively linked, can process such data along with the image data to determine which physical objects 130-152 generate which sounds.

In another aspect of the present arrangements, one or more of the sensors 120, 122, 220, 222 can be infrared sensors configured to detect motion and output corresponding sensor data indicating the detected motion(s). The VR apparatus 110, or one or more data processing systems and/or gaming controllers to which the VR apparatus 110 is communicatively linked, can process such sensor data to identify one or more physical objects 130-152 that are moving in the real world environment 100.

The sensors 224, 226 can detect motion of the VR apparatus 110, and thus motion of the user 105. For example, the sensors 224, 226 can output sensor data indicating movement, rotation, etc. of the head of the user 105 in any direction and rate of such movement. In illustration, the sensors 224, 226 can detect the user 105 turning his head sideways, the user looking up or down, the user moving toward or away from one or more physical objects 130-152, and so on. In this regard, the sensors 224, 226 can be accelerometers or any other type of sensors suitable for detecting any of a variety of types of movements of the VR apparatus 110 while being worn by the user 105.

As noted, the VR apparatus 110, or one or more data processing systems and/or gaming controllers to which the VR apparatus 110 is communicatively linked, can receive sensor data from the sensors 160-166 (FIG. 1). The sensors 160-166 can output sensor data including, image data, audio data, and/or motion detection data. The VR apparatus 110, or one or more data processing systems and/or gaming controllers to which the VR apparatus 110 is communicatively linked, can process such sensor data as previously described to generate stereoscopic image data and/or stereo audio data, and process such data to determine the shape/spatial dimensions of the various physical objects 130-152, determine which physical object 130-152 generate one or more sounds, etc. Further, VR apparatus 110, or one or more data processing systems and/or gaming controllers to which the VR apparatus 110 is communicatively linked, can process the motion detection data to determine which physical objects 130-152, if any, are moving in the real world environment 100, as well as determine various movements of the user 105 within the real world environment 100.

Figure 3:
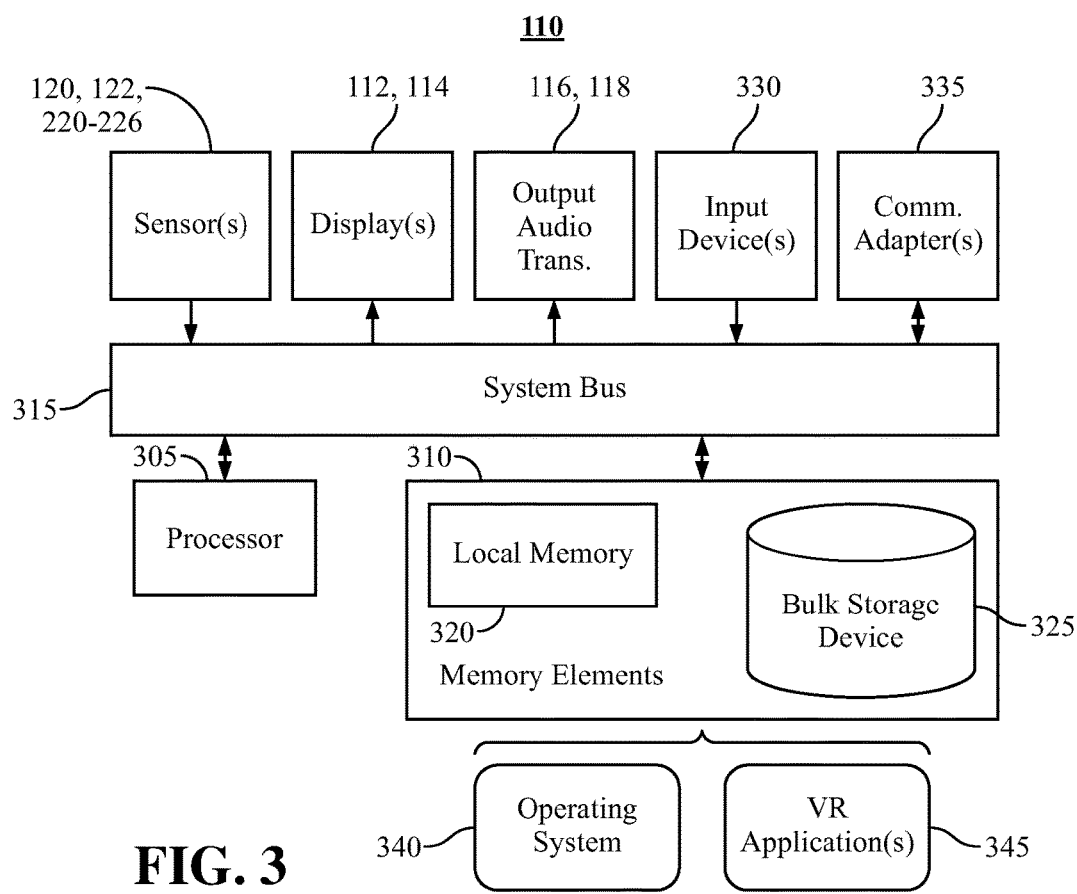
FIG. 3 is a block diagram illustrating example architecture for a virtual reality apparatus.

FIG. 3 is a block diagram illustrating example architecture for a VR apparatus 110. An AR apparatus 110 can be similarly configured. The VR apparatus 110 can include at least one processor 305 (e.g., a central processing unit, DSP, FPGA, ASIC, controller, etc.) coupled to memory elements 310 through a system bus 315 or other suitable circuitry. As such, the VR apparatus 110 can store program code within the memory elements 310. The processor 305 can execute the program code accessed from the memory elements 310 via the system bus 315. It should be appreciated that the VR apparatus 110 can be implemented in the form of any system including a processor and memory that is capable of performing the functions and/or operations described within this specification as being performed by the VR apparatus 110.

The memory elements 310 can include one or more physical memory devices such as, for example, local memory 320 and one or more bulk storage devices 325. Local memory 320 refers to random access memory (RAM) or other non-persistent memory device(s) generally used during actual execution of the program code. The bulk storage device(s) 325 can be implemented as a solid state drive (SSD) or other persistent data storage device. The VR apparatus 110 also can include one or more cache memories (not shown) that provide temporary storage of at least some program code in order to reduce the number of times program code must be retrieved from the bulk storage device 325 during execution.

As noted, the VR apparatus 110 can include one or more sensors 120, 120, 220-226. The sensors 120, 120, 220-226 can be coupled to the VR apparatus 110 either directly via the system bus 315 or through intervening I/O controllers (not shown). The VR apparatus 110 also can include at least one display 112, 114 (or display 212), as noted. The display(s) 112, 114 (or display 212) can be coupled to the VR apparatus 110, for example via a graphics processing unit (GPU) (not shown). The GPU can be a discrete device coupled to the system bus 315 or a component of the processor 305. The VR apparatus 110 also can include at least one output audio transducer 116, 118, as noted. In one non-limiting arrangement, the output audio transducer(s) 116, 118 can be coupled to the VR apparatus 110 via a digital-to-audio converter (not shown). In one aspect, the output audio transducer(s) 116, 118 can be integrated in headphones and/or loudspeakers communicatively linked to the VR apparatus 110 via one or more communication ports and/or audio ports.

One or more input devices 330 can be coupled to the VR apparatus 110 either directly or through intervening I/O controllers. Examples of the input devices 330 include buttons, joysticks, sliders, switches, and so on, configured to receive user inputs and communicate those user inputs to the VR apparatus 110 to initiate any of a variety of processes and/or actions. Another example of an input device 330 includes a gaming controller (420 of FIG. 4) One or more communication adapters 335 also can be coupled to VR apparatus 110 to enable the VR apparatus 110 to become coupled to other systems, data processing systems, gaming controllers, remote storage devices, etc. Transceivers and communications ports are examples of different types of communication adapters 335 that can be used with the VR apparatus 110. Examples of communication adapters include, but are not limited to, a WiFi™ transceiver, a PAN transceiver (e.g., Bluetooth® transceiver), a universal serial bus (USB) port, an IEEE-1394 communication port, etc.

As pictured in FIG. 3, the memory elements 310 can store the components of the VR apparatus 110, for example an operating system 340 and one or more VR applications 345. Being implemented in the form of executable program code, these components of the VR apparatus 110 can be executed by the processor 305 and, as such, can be considered part of the VR apparatus 110. Moreover, the operating system 340 and VR application(s) 345 are functional data structures that impart functionality when employed as part of the VR apparatus 110. The VR applications 345, for example, can include VR gaming applications. The VR applications 345 can receive the sensor data from the various sensors 120, 122, 220-226 and/or external sensors (e.g., sensors 160-166 of FIG. 1), and process the sensor data to initiate various processes, including VR processes, as will be described herein.

Figure 4:
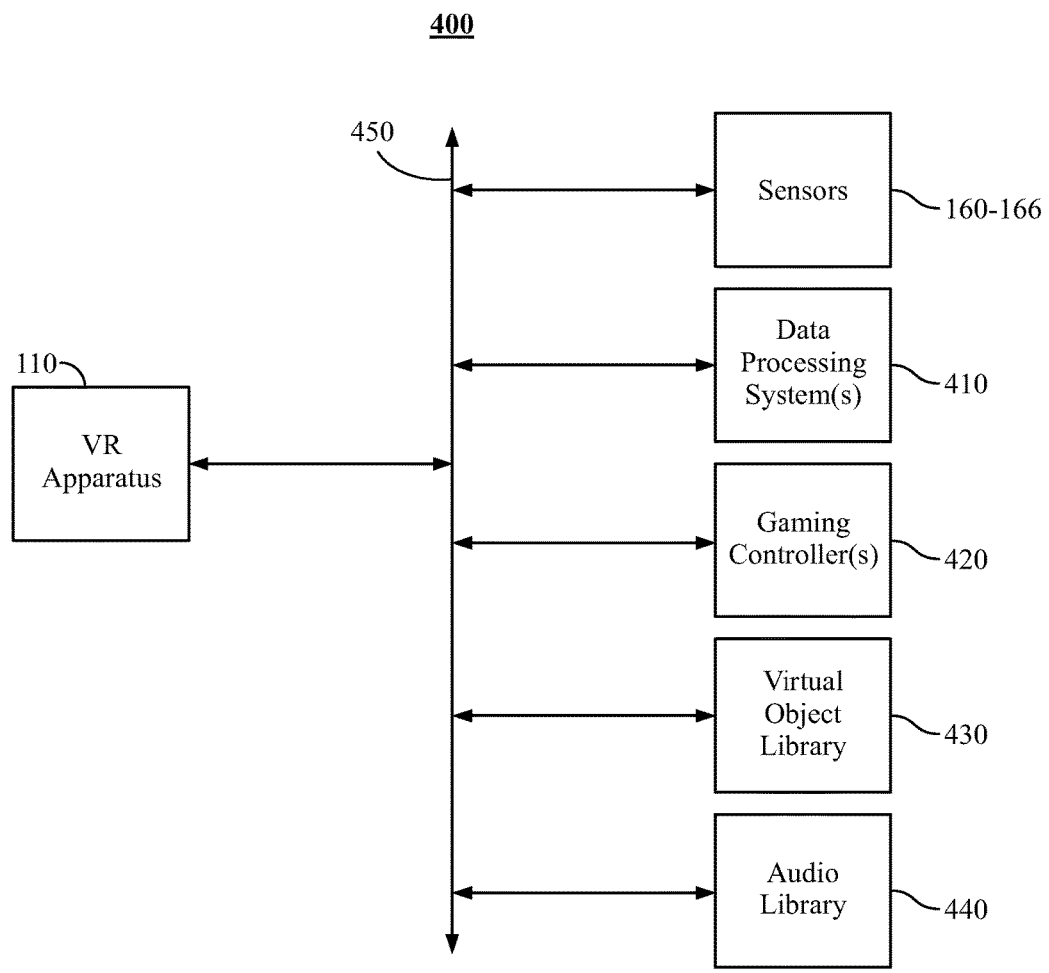
FIG. 4 is a block diagram illustrating an example of a virtual reality computing environment.

FIG. 4 is a block diagram illustrating an example of a VR computing environment 400. An AR computing environment can be similarly configured. The VR computing environment 400 includes the VR apparatus 110. The VR computing environment 400 optionally may include one or more other devices and/or systems, for example the sensors 160-166, one or more data processing systems 410 and/or one or more gaming controllers 420. Further, the VR computing environment 400 optionally may include one or more libraries, for example a virtual object library 430 and an audio library 440. The virtual object library 430 library can include one or more data tables configured to store tags and other information associated with respective virtual objects, as well as files that store the virtual objects. Similarly, the audio library 440 can include one or more data tables configured to store tags and other information associated with respective audio data (e.g., sound clips), as well as files that store the audio data. Further, the virtual object library 430 data table(s) and/or the audio library 440 data tables can include tags and/or links that link various audio data with various virtual objects.

In one arrangement, the virtual object library 430 and/or audio library 440 can be stored by the VR apparatus 110, the data processing system 410 and/or the gaming controller 420. In another arrangement, the virtual object library 430 and/or audio library 440 can be stored by one or more other systems to which the VR apparatus 110, the data processing system 410 and/or the gaming controller 420 is communicatively linked (e.g., via the Internet), and which make(s) the virtual object library 430 and/or audio library 440 available to the VR apparatus 110, data processing system 410 and/or gaming controller 420 via the communication link(s).

The VR apparatus 110, sensors 160-166, data processing system 410, the gaming controller 420 and/or other data processing system(s) hosting the virtual object library 430 and audio library 440 can be communicatively linked via one or more communication networks 450. The VR apparatus 110, sensors 160-166, data processing system(s) 410, a gaming controller(s) 420 and/or other system(s) can exchange data, as described herein, via the communication network(s) 450. The communication network(s) 450 may include communication links, such as wired communication links, wireless communication links and/or fiber optic communication links. The communication network(s) 450 can be implemented as, or include, any of a variety of different communication technologies such as a wide area network (WAN), a local area network (LAN), a personal area network (PAN), a wireless network, a mobile network, a Virtual Private Network (VPN), the Internet, the Public Switched Telephone Network (PSTN), or similar technologies.

The gaming controller(s) 420 can include one or more user input components, such as buttons, joysticks, sliders, switches, etc. configured to receive user inputs. In one arrangement, the gaming controller(s) 420 can be configured as a device, or devices, separate from, but communicatively linked to, the VR apparatus 110 and/or data processing system(s) 410. In this regard, the gaming controller(s) 420 can receive user inputs and communicate data corresponding to the user inputs to the VR apparatus 110 and/or data processing system(s) 410 via the communication network(s) 450. In another arrangement, the gaming controller(s) 420 can be integrated with the VR apparatus 110 and/or integrated with the data processing system(s) 410, and thus can communicate data corresponding to the user inputs directly to the VR apparatus 110 or the data processing system(s) 410.

Figure 5:
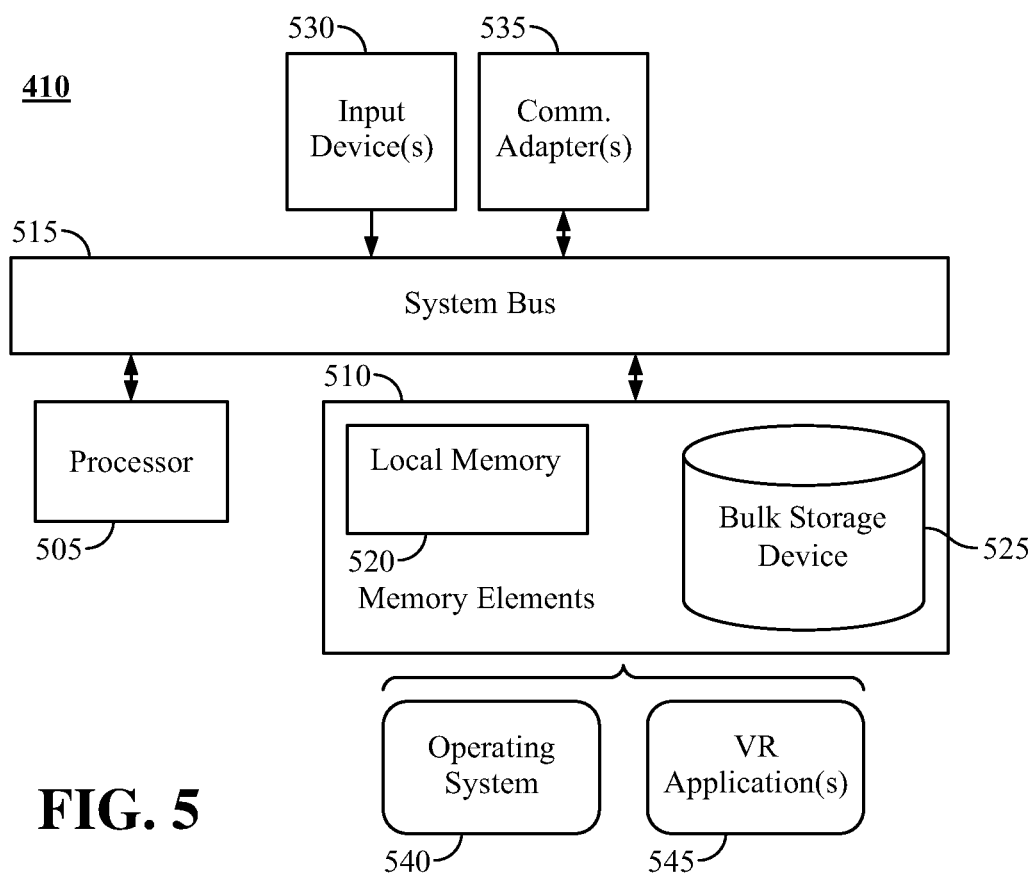
FIG. 5 is a block diagram illustrating example architecture for a data processing system.

FIG. 5 is a block diagram illustrating example architecture for a data processing system 410. The data processing system 410 can include at least one processor 505 (e.g., a central processing unit) coupled to memory elements 510 through a system bus 515 or other suitable circuitry. As such, the data processing system 410 can store program code within the memory elements 510. The processor 505 can execute the program code accessed from the memory elements 510 via the system bus 515. It should be appreciated that the data processing system 410 can be implemented in the form of any system including a processor and memory that is capable of performing the functions and/or operations described within this specification. For example, the data processing system 410 can be implemented as a server, a plurality of communicatively linked servers, a workstation, a desktop computer, a mobile computer, a tablet computer, a laptop computer, a netbook computer, a smart phone, a personal digital assistant, a set-top box, a gaming device, a network appliance, and so on.

The memory elements 510 can include one or more physical memory devices such as, for example, local memory 520 and one or more bulk storage devices 525. The bulk storage device(s) 525 can be implemented as a hard disk drive (HDD), solid state drive (SSD), or other persistent data storage device. The data processing system 410 also can include one or more cache memories (not shown) that provide temporary storage of at least some program code in order to reduce the number of times program code must be retrieved from the bulk storage device 525 during execution.

One or more input devices 530 can be coupled to the data processing system 410 either directly or through intervening I/O controllers. An example of the input device(s) 530 is the gaming controller 420. One or more communication adapters 535 also can be coupled to data processing system 410 to enable the data processing system 410 to become coupled to other systems/devices, such as the VR apparatus 110, the gaming controller(s) 420 and/or other computer systems, remote storage devices, etc. through intervening communication links. Ports (e.g., USB ports, IEEE-1394 ports, etc.), modems, cable modems, transceivers, and Ethernet cards are examples of different types of communication adapters 535 that can be used with the data processing system 410.

As pictured in FIG. 5, the memory elements 510 can store the components of the data processing system 410 for example an operating system 540 and one or more VR applications 545. Being implemented in the form of executable program code, these components of the data processing system 410 can be executed by the processor 505 and, as such, can be considered part of the data processing system 410. Moreover, the operating system 540 and VR application(s) 545 are functional data structures that impart functionality when employed as part of the data processing system 410. The VR applications 545, for example, can include VR gaming applications. The VR applications 545 can receive the sensor data from the various sensors 120, 122, 220-226 and/or sensors 160-166 (FIGS. 1 and 2), and process the sensor data to initiate various processes, including VR processes, including interfacing with the VR apparatus 110 to present images/video and/or audio to the user 105 via the VR apparatus 110, as will be described herein.

The gaming controller 420 of FIG. 4 can be configured in a manner similar to that described form the data processing system 410, for example in an arrangement in which the gaming controller executes one or more VR applications to perform various arrangements described herein.

Figure 6:
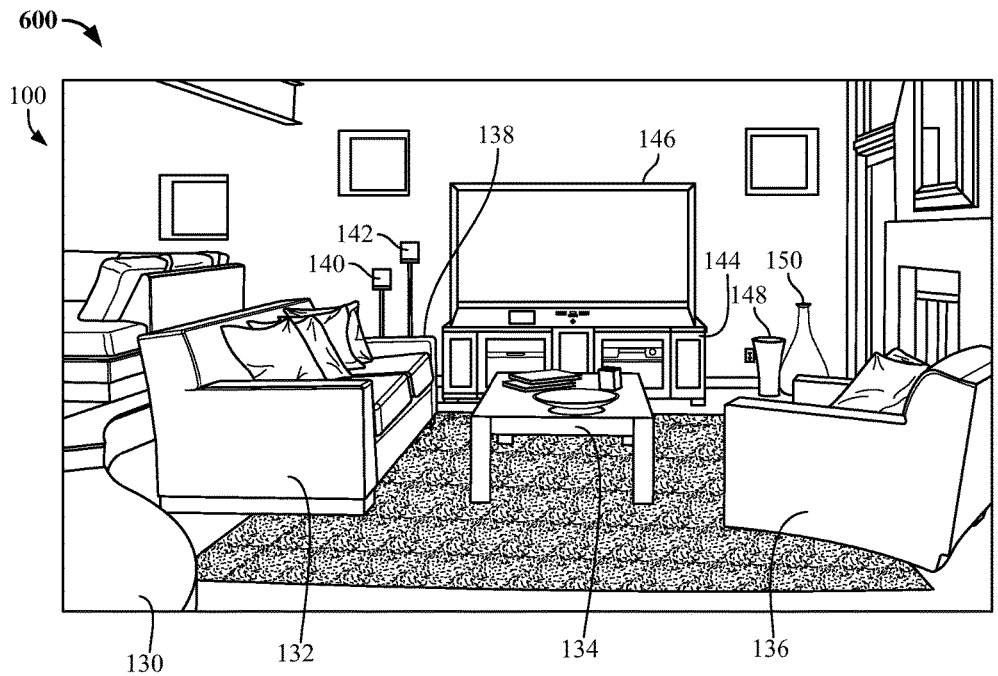
FIG. 6 depicts a view of a real world environment.

FIG. 6 depicts a view 600 of the real world environment 100. The view 600 can include the physical objects 130, 132, 134, 136, 138, 140, 142, 144, 146, 150.

Figure 7:
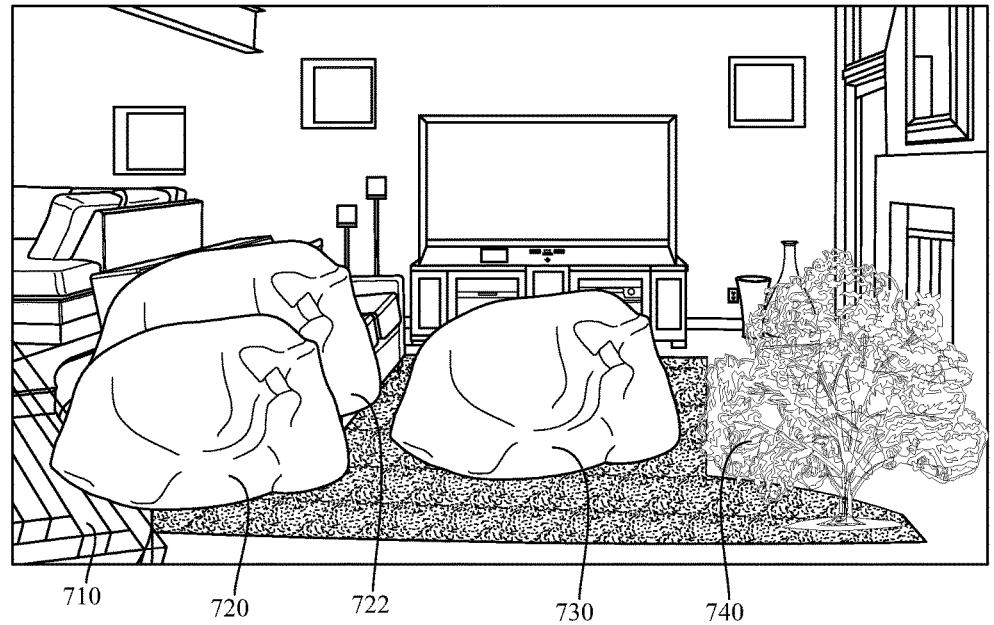
FIG. 7 depicts a view of virtual objects that are associated with physical objects.

FIG. 7 depicts a view 700 of virtual objects 710, 720, 722, 730, 740 associated with the physical objects 130, 132, 134, 136 of FIG. 6. The virtual objects 710-740 need not look like the physical objects 130, 132, 134, 136, but instead can be selected or generated to match visual characteristics of a virtual reality (VR) environment (or AR environment), for example a theme of the VR environment. The association of the virtual objects 710-740 with the physical objects 130-136 can be performed by the VR apparatus 110, or one or more data processing systems 410 and/or gaming controllers 420 to which the VR apparatus 110 is communicatively linked. The association of the virtual objects 710-740 can be based on received sensor data and parameters specified by the VR application 345 (or VR application 545) initiating presentation of images/video/audio by the VR apparatus 110. In the remaining description, reference will be made to the VR application 345, but it will be understood that the described processes can be performed by the VR application 545.

The VR application 345 can receive the sensor data from one or more of the sensors 120, 122, 160-166, 220-226 and, based on such sensor data, determine the shape/spatial dimensions of the physical objects 130-150, the location of the physical objects 130-150 relative to the user 105 in the real world environment 100, and a VR environment (or AR environment) being presented to the user 105 by the VR apparatus 110 (or AR apparatus), such as a VR environment presented by a VR application 345. Based on such determinations, the VR application 345 can select, from the virtual object library 430, virtual objects 710-740 that satisfy specific criteria. The specific criteria can correspond to the shape/spatial dimensions of the physical objects 130-150, the location of the physical objects 130-150 relative to the user 105 in the real world environment 100, and the VR environment being presented to the user 105. The VR application 345 can query the virtual object library 430 to identify virtual objects that satisfy the specific criteria, or automatically generate virtual objects that satisfy the specific criteria using one or more algorithms that correlate characteristics of real physical objects to generation of virtual objects.

In illustration, each virtual object in the virtual object library 430 can be assigned one or more tags describing the virtual object. The tags can be queried to identify virtual objects that satisfy the specific criteria. The description can indicate a type of the virtual object, default dimensions, characteristics (e.g., moveable, not moveable, visual effects that may be applied to the virtual object, etc.). Some virtual objects also may have sounds (e.g., one or more audio clips) assigned to the virtual objects. For example, if a virtual object is a wolf, howling sounds contained in the audio library 440 can be assigned to the virtual object using one or more tags and/or links. If the virtual object is a bush or tree, sounds of rustling leaves can be assigned to the virtual object.

Further, the VR application 345 can, based on parameters assigned to the selected virtual objects 710-740 and the shape/spatial dimensions of the physical objects 130-150, determine a size scaling factor to apply to a visual presentation of the virtual objects 710-740 by the VR apparatus 110. A size scaling factor can be a scaling factor that scales at least one dimension of one or more virtual objects 710-740 to be within a threshold value of at least one dimension of a physical object 130-136 in the real world environment 100 being replaced with the virtual object(s) 710-740 in the VR environment. For example, if a physical object, such as a couch, is being replaced by one or more virtual rocks, a diameter of the virtual rock(s) can be within a threshold value a width of physical object. Nonetheless, various other scaling factors can be implemented and the present arrangements are not limited in this regard.

In the present example, assume the physical object 130 is one or more steps. Also, assume that the VR application 345 is presenting a VR environment for a game with a nineteenth century western theme. The VR application 345 can select a virtual object 710, for example wooden steps, to present in the VR environment at a location, relative to a representation of the user 105 in the VR environment, that correlates with a location of the physical object 130, relative to the user 105, in the real world environment 100. In this regard, the VR application 345 can associate the virtual object 710 with the physical object 130, and place the virtual object 710 in the VR environment. In this regard, the virtual object 710 can represent the physical object 130 in the VR environment, though in a manner that visually matches characteristics of the VR environment.

In illustration, the VR application can determine real world environment coordinates of the location of the physical object 130, relative to the user 105, in the real world environment 100. The real world environment coordinates can, for example, indicate a distance and direction of one or more portions of the physical object 130 from the user 105 (e.g., from the VR apparatus 110). The direction can be measured with respect a direction in which the user 105 is facing (e.g., the direction in which the VR apparatus 110 is facing). The direction the user 105 is facing can be, for example, a direction that is perpendicular to a surface of the front portion 210 of the VR apparatus 110. Further, the VR apparatus 110 can perform image recognition on sensor data pertaining the physical object 130 to determine an object type for the physical object 130. Such image recognition is well known in the art. For instance, the VR application 345 can identify the physical object 130 as being steps.

Having determined the physical object 130 to be steps, and the location/coordinates of the physical object 130 relative to the user 105 in the real world environment 100, the VR application 345 can specify criteria for a virtual object 710 to use to represent the physical object 130 in the VR environment. Based on the specified criteria, the VR application 345 can select from the virtual object library 430, and/or generate based on a virtual object generation algorithm, the virtual object 710 to present in the VR environment. For example, the VR application 345 can select from the virtual object library 430 wood steps that match the theme of the VR environment. Further, the VR application 345 can scale at least one dimension of the wood steps to generate the virtual object 710 to be within a threshold size of the physical object 130. Further, the VR application 345 can present the virtual object 170 at coordinates in the VR environment, relative to a virtual representation of the user 105, that correspond to the determined coordinates of the physical object 130 relative to the user in the real world environment 100.

The virtual representation of the user 105 can be an avatar representing the user 105 that is presented in the VR environment, or another computer-based object representing the user 105 in the VR environment. For example, a computer-based object can be used to represent a user 105 in the VR environment, including the user's location and perspective in the VR environment, and present a first person perspective of the VR environment to the user 105. A first person perspective typically is configured for rendering of images from the user's viewpoint in the VR environment depending on where the computer-based object is located in the VR environment and the direction the user 105 is looking in the VR environment using the computer-based object. The VR environment need not present a virtual image of the computer-based object to the user 105, or may only present a partial image of the computer-based object. For example, the user 105 may only see the user's hands as the user performs certain actions in the VR environment. Other users participating in the VR environment, if any, may see an avatar representing the user 105. Computer-based objects representing first person perspectives are well known in the art.

By way of example, if in the real world environment 100 the physical object 130 is located a distance of five feet from the user 105 at an angle of sixty degrees with respect to the direction the user 105 is facing, the VR application 345 can place the virtual object 710 in the VR environment at a distance of five feet, or a scale of that distance, from a virtual representation of the user 105 in the VR environment, and at an angle of sixty degrees with respect to the direction that the virtual representation of the user 105 is facing in the VR environment.

In one arrangement, the distance can be scaled to be greater than, or less than, the detected real world distance. For example, if movements of the user 105 in the real world environment 100 are scaled when the VR application 345 translates the user's movements into the VR environment, the same scaling factor can be used to scale the distance the virtual object 710 is placed from the user 105 in the VR environment. For instance, if every one foot the user 105 moves in the real world environment 100 are doubled by the virtual representation of the user 105 in the VR environment to two feet of movement, the VR application 345 can place the virtual object 710 in the VR environment a distance that is two times five feet (i.e., ten feet).

In a manner similar to those described above, the VR application 345 can place virtual objects 720, 722, 730, 740 in the VR environment. For example, the VR application 345 can select the virtual objects from the virtual object library 430, scale the virtual objects to generate the virtual objects 720, 722 (e.g., rocks), and place the virtual objects 720, 722 in the VR environment at coordinates, relative to the representation of user 105 in the VR environment, corresponding to coordinates of the physical object 132 relative to the user 105 in the real world environment 100. Similarly, the VR application 345 can select and scale a virtual object to generate the virtual object 730 (e.g., a rock) and place the virtual object 730 in the VR environment at coordinates, relative to the virtual representation of the user 105, matching coordinates of the physical object 134 relative to the user 105 in the real world environment 100. Further, the VR application 345 can select and scale a virtual object to generate a virtual object 740 (e.g., a bush) and place the virtual object 740 in the VR environment at coordinates, relative to the virtual representation of the user 105, matching coordinates of the physical object 136 relative to the user 105 in the real world environment 100.

Further, the VR application 345 can generate and place additional virtual objects in the VR environment at locations corresponding to the locations of the physical objects 138-150 relative to the user 105, for example in a manner similar to that previously described.

It should be noted that the VR application 345 can vary the types of virtual objects 710-740 that are placed in the VR environment according to the theme of the VR environment. In illustration, assume that more than one type of virtual object satisfies the criteria specified for the respective physical objects 132-136. Rather than placing the same type of virtual object 720-740 at each of the respective locations in the VR environment, the VR application 345 can select different types of virtual objects 720-740, such as rocks and bushes, thus providing greater realism and/or a greater entertainment factor for the user 105.

In this regard, the VR application 345 can implement a suitable algorithm, for example, an algorithm using a random number generator, to select the virtual objects 720-744 from among a plurality of virtual objects that satisfy the specified criteria. For instance, if the VR application 345 identifies three virtual objects that satisfy the criteria specified for replacing the physical object 136, the VR application 345 can assign a respective value to each of the identified virtual objects (e.g., 1, 2 and 3, respectively). The VR application 345 can execute a random number generator to output random values (e.g., between 1 and 99). Since there are three identified virtual objects, the VR application 345 can specify that random values between 1 and 33 correspond to 1, random values between 34 and 66 correspond to 2, and random values between 67 and 99 correspond to 3. Based on the random value output by the random number generated and the specified correspondence, the VR application 345 can select a virtual object to present in the VR environment. For instance, if the random number generator outputs a value of 47, the VR application 345 can select virtual object assigned the value of 2.

Figure 8:
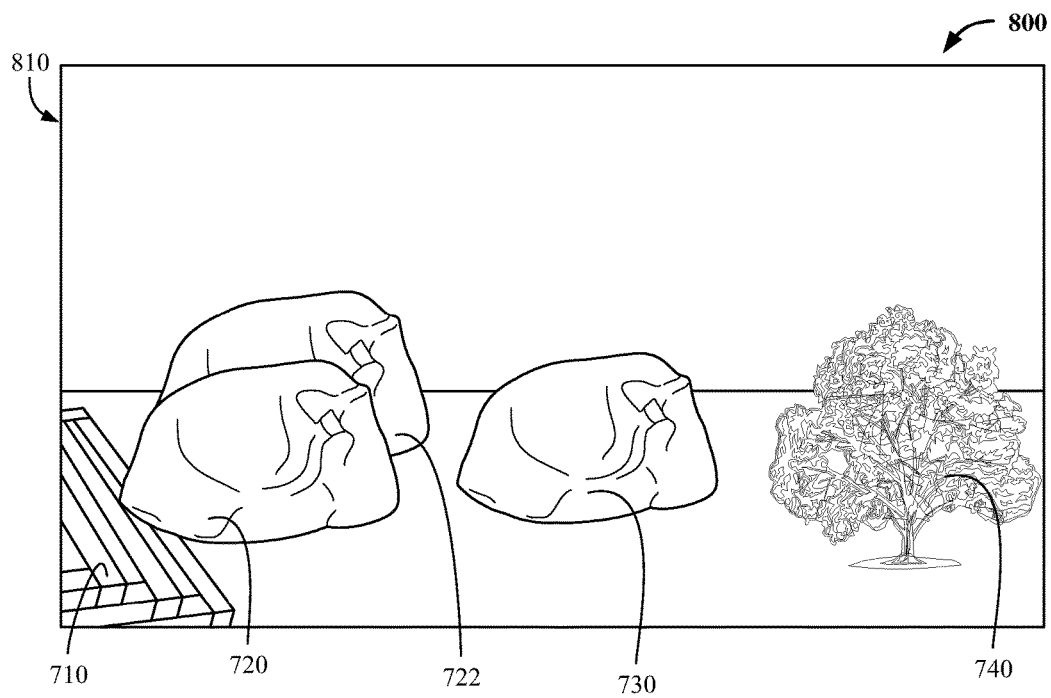
FIG. 8 depicts a view of the virtual objects of FIG. 7 in a virtual reality presentation layer.

FIG. 8 depicts a view 800 of the virtual objects 720, 722, 730, 740 of FIG. 7 in a VR presentation layer 810 for the VR environment (or AR environment). When placing the virtual objects 720, 722, 730, 740 into the VR environment, the VR application 345 can place the virtual objects 720, 722, 730, 740 in the VR presentation layer 810.

Figure 9:
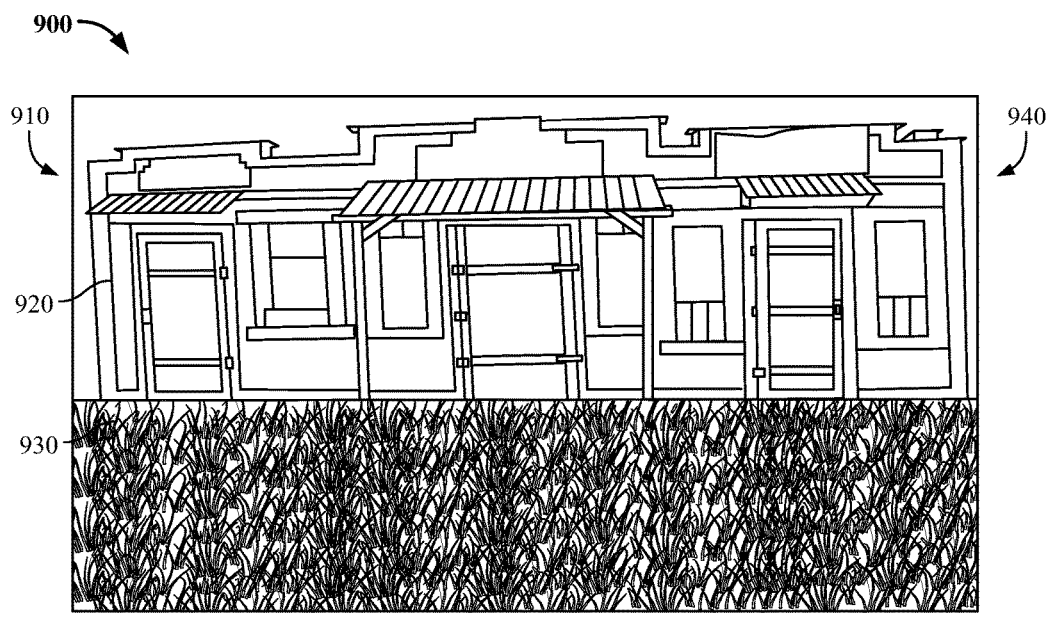
FIG. 9 depicts a view of other virtual objects in another virtual reality presentation layer.

FIG. 9 depicts a view 900 of other virtual objects 920, 930 in another VR presentation layer 910. The virtual objects 920, 930 can be generated by the VR application 345 as part of the VR environment 940 (or AR environment). For example, the virtual objects 920, 930 can be virtual objects at a location in the VR environment the user 105 is exploring.

Figure 10:
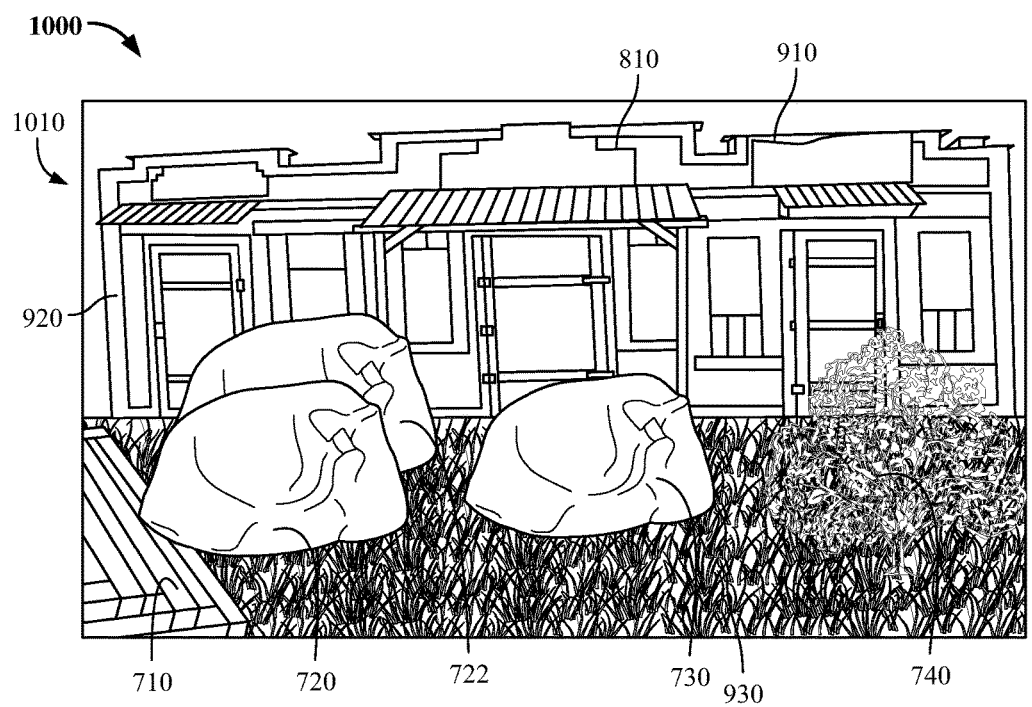
FIG. 10 depicts a view of a virtual reality environment.

FIG. 10 depicts a view 1000 of a VR environment 1010. The view 1000 can be created by combining the VR presentation layers 810, 910. For example, the VR application 345 can overlay the VR presentation layer 810 onto the VR presentation layer 910 using image processing techniques known in the art. Thus, the VR environment 1010 can present to the user 105 the virtual objects 710-740 and virtual objects 920, 930 via the display(s) of the VR apparatus 110.

As the user 105 moves about the real world environment 100, the VR application 345 can track, in real time based on the sensor data, the user's movements and changes with regard to the location of the user 105 with respect to the physical objects. The VR application 345 can change the perspective of the virtual objects 710-740, 920, 930 as presented to the user 105 in the VR environment 1010, to reflect the user's movements and location changes with respect to the physical objects 130-150 in the real world environment 100. For example, if the user 105 moves toward a physical object 134 (FIG. 6) in the real world environment 100, the VR application 345 can update, in real time, presentation of the VR environment 1010 to show that the virtual representation of the user 105 in the VR environment 1010 is moving toward the virtual object 730. Moreover, directions in which the virtual object 710-740, 920, 930 are presented, with respect to the direction the virtual representation of the user 105 is facing in the VR environment 1010, can track the directions of the physical objects 130-150 with respect to the direction the user 105 is facing in the real world environment 100.

Figure 11:
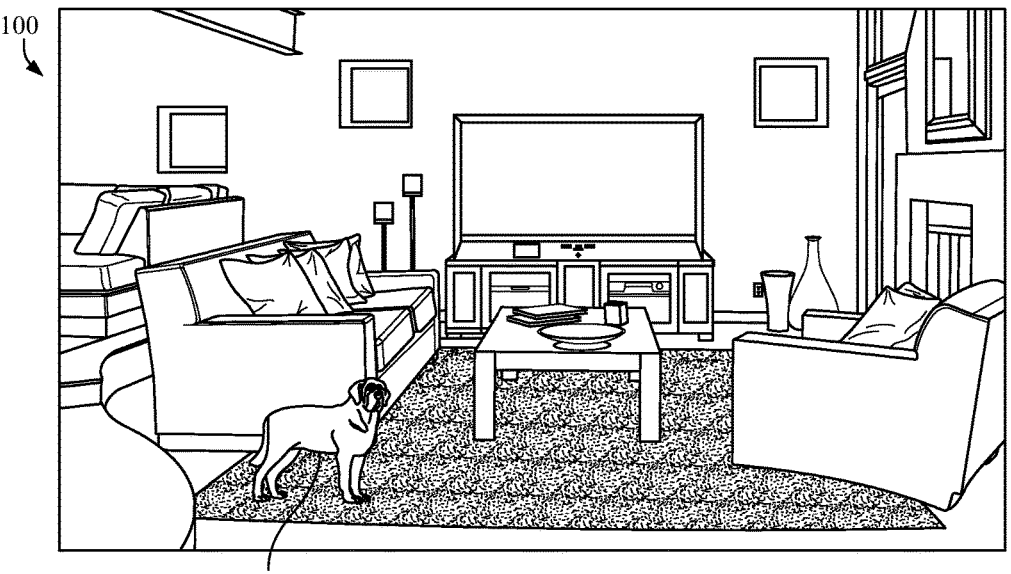
FIG. 11 depicts another view of a real world environment.

FIG. 11 depicts another view 1100 of the real world environment 100. In this example, a physical object 1110 (e.g., a dog) has wandered into the real world environment 100. Based on the sensor data, the VR application 345 can detect, in real time, the physical object 1110. Further, using image recognition, the VR application 345 can determine a type of the physical object 1110 (e.g., a dog). The VR application 345 also can determine a type of the physical object 1110 by analyzing any sounds emanated by the physical object 1110. For example, if the physical object 1110 barks, the VR application 345 can determine the physical object 1110 to be a dog. The VR application 345 can identify certain characteristics of the physical object 1110 based on the sensor data (e.g., dimension, size, type, movement patterns, etc.), specify criteria for the physical object 1110 based on the identified characteristics, and select a virtual object to represent the physical object 1110 in the VR environment 1010 that at least partially match the identified characteristics. The selected virtual object need not look like the physical object 1110, but instead can be selected to match the theme (e.g., visual characteristics) of the VR environment.

Figure 12:
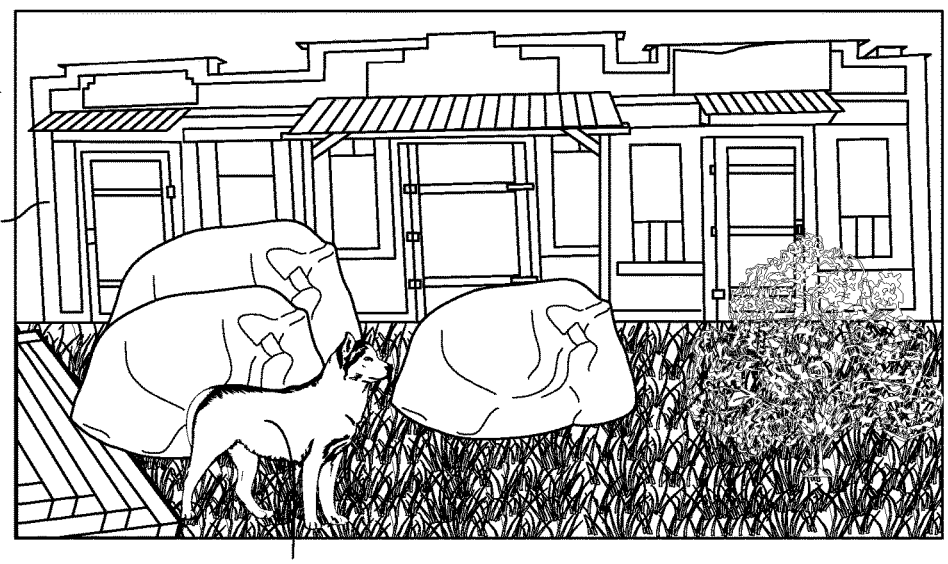
FIG. 12 depicts another view of the virtual reality environment.

FIG. 12 depicts a view 1200 of the VR environment 1010. In the view 1200, the VR application 345 can place into the VR environment 1010 the virtual object 1210 (e.g., a wolf) selected to represent the physical object 1110. For example, the VR application 345 can place the virtual object 1210 in the VR presentation layer 810 (FIG. 8). Again, the VR application 345 can place the virtual object 1210 in the VR environment 1010 at coordinates, relative to the user 105, corresponding to coordinates of the physical object 1110 relative to the user 105 in the real world environment 100.

In the case that the physical object 1110 is an object that moves (e.g., a pet), the virtual object 1210 that is selected can be a virtual object that moves, and the VR application 345 can move, in the VR environment 1010, the virtual object 1210 to correspond to (e.g., mimic) the movements of the physical object 1110. For example, the virtual object 1210 can be configured to be manipulated by the VR application 345 to walk, run, jump, fly, etc. in the VR environment using techniques known in the art of virtual reality. Processing the sensor data for the physical object 1110, for example using image recognition technologies, the VR application 345 can monitor the movements of the physical object 1110 and translate those movements to movements of the virtual object 1210. Further, the VR application 345 can make the virtual object 1210 a character in the VR environment 1010. For example, the VR application 345 can make the virtual object 1210 an enemy the user may confront and/or befriend VR environment 1010, or make the virtual object a friend or comrade (e.g., brother in arms) of the user in the VR environment 1010.

As noted, the physical object 1110 may generate sounds in the real world environment 100 (real world sounds) detected by the VR application 345, and the VR application 345 can detect that the physical object 1110 is the source of the real world sounds. The VR application 345 also may detect other real world sounds heard in the real world environment 100, for example the sound of airplanes, cars, etc. In response to detecting a real world sound, the VR application 345 can determine a nature of the sound and, based on the nature of the sound, select a sound in the VR environment (VR sound) that may be used to mask the real world sound. The VR sound that is selected can be a VR sound that matches the theme of the VR environment, and that matches certain characteristics of the real world sound (e.g., howling of a wolf can be selected to mask a dog bark, a sound of a dragon breathing fire can be selected to mask a sound of an airplane, etc.). The VR application 345 can present the selected VR sound to the user in the VR environment in order to mask the real world sound, which can enhance the virtual reality experience for the user. In illustration, the VR application 345 can access audio data (e.g., digital sound tracks) from the audio library 440, and play back that audio data via the output audio transducer(s) 116, 118.

By way of example, the VR application 345 can select the virtual object 1210 to represent a source of the VR sound. The VR application 345 can select the virtual object 1210 to match certain characteristics of the physical object 1110 that is the source of the real world sound for which the VR sound is selected to mask. The selected virtual object 1210 need not look like the physical object 1110, however, but instead can be selected to match the theme (e.g., visual characteristics) of the VR environment. One or more dimensions of the selected virtual object 1210, as presented in the VR environment, can be similar to one or more dimensions of physical object 1110, for instance within a threshold percentage of a dimension of the physical object 1110.

In illustration, responsive to detecting a dog bark, the VR application 345 can, in real time, generate output audio signals via the output audio transducer(s) 116, 118 that mask, at least partially, or enhance the dog bark. In illustration, responsive to detecting the dog bark, the VR application 345 can identify certain characteristics of that real world sound and access, from the audio library 440, audio data, for example of a wolf howling, at least partially matching the identified characteristics of the real world sound. In another example, if the VR environment 1010 is a space station, and the physical object 1110 is a bird that squawks, the VR application 345 can play back audio to mask the bird squawk, for example communication static. The VR application 345 can output a corresponding audio signal via the output audio transducer(s) 116, 118 while the sound emanated by the physical object 1110 continues to be detected. Thus, the user 105 can hear the sound generated by the VR application 345. Further, when outputting the sound, the VR application 345 can manipulate images of the virtual object 1210 being presented in the VR environment 1010 to depict the virtual object 1210 howling.

In another example, the VR application 345 can detect other sounds in the real world environment 100, which need not be emanated by the physical objects 130-150, and mask or enhance those sounds. For instance, based on the sensor data, the VR application 345 can detect the sound of an airplane flying over the real world environment 100 (e.g., flying above a structure in which the real world environment 100 is located). The VR application 345 can process the sensor data corresponding to the detected sound and identify, in real time, a type of the sound and a type of a physical object that is the source of the sound. The VR application 345 can select a sound from the audio library 440 that correlates to the identified sound in the VR environment 1010. For example, if the VR environment 1010 is a western theme, the VR application 345 can select a sound of a moving steam locomotive/train and play back that sound via the output audio transducer(s) 116, 118 while the sound in the real world environment 100 continues to be detected.

In one aspect of the present arrangements, the VR application 345 can determine a virtual object to represent the source of the detected sound, even if an image of a physical object generating the detected is not included in the sensor data. Continuing with the previous example, the VR application 345 can present the moving steam locomotive/train in the VR environment 1010, for instance to the right of the virtual object 920 and off in the distance. In another example, if the detected sound is a sound of a bird, the VR application 345 can present a bird flying in the VR environment 1010, regardless of whether an image of the bird is contained in the sensor data captured of the real world environment 100. In another example, if the VR environment is a driving simulator, and the detected sound is a sound of a plane, the VR application 345 can present a plane flying in the VR environment 1010, and enhance the detected sound of the plane in the VR environment 1010, for example by selectively amplifying and/or applying sound effects to the detected sound. In another example, if the VR environment is a medieval fantasy game, and the detected sound is a sound of a plane, the VR application 345 can present a dragon in the VR environment 1010, and mask and/or enhance the detected sound of the plane in the VR environment 1010, for example by generating fire type sounds and/or selectively amplifying and/or applying sound effects to the detected sound.

Further, the VR application 345 can selectively adjust a volume (i.e., amplitude) of a generated sound based on a sound pressure level of the detected sound that is being masked or enhanced. For example, if the physical object 1110 begins barking while in another room, and moves into the real world environment 100 while continuing to bark, the sound pressure level of the barks likely will increase as the physical object 1110 moves closer, and into, the real world environment 100. The VR application 345 can selectively adjust a volume of the sound of the wolf howling as the sound pressure level continues to increase. If the sound pressure level of the barking decreases, for example, due to the physical object 1110 moving away from the real world environment 100, the VR application 345 can selectively decrease a volume of the sound of the wolf howling. Further, the VR application 345 can selectively control the volume of the generated sounds across a plurality of audio channels to produce audio stereo imaging effects that cause the user to perceive the generated sounds as being emanated at a spatial location where the physical object 1110 is located relative to the location of the user in the real world environment 100.

Similarly, the sound pressure level detected for a plane flying overhead may begin at a low volume, increase as the plane approaches the real world environment 100, and decrease after the plane passes. The VR application 345 can selectively adjust the volume of the moving steam locomotive/train based on the changes in the sound pressure level of the detected sound of the plane. Further, as the detected sound pressure level of the plane decreases, indicating the plane is moving away from the real world environment 100, the VR application 345 can change a pitch of the sound of the moving locomotive/train, for example to simulate the Doppler effect on the sound of a moving locomotive/train that occurs when the locomotive/train passes. Also, the VR application 345 can produce audio stereo imaging effects so that the sound of the moving locomotive/train is perceived by the user as being emanated from a same spatial direction where the plane is located, and selectively control the volume of the generated sounds across a plurality of audio channels to have the perceived direction of the generated sound track the actual direction of the plane relative to the user as the plane moves. For instance, if the plane is moving, relative to the user, in a direction from left to right, the audio stereo imaging effects can cause the sound to be perceived by the user to be emanating in the VR environment from an object that is moving from left to right.

The audio library 440 can include audio data (e.g., sound clips, digital samples, etc.) of various sounds that may be emanated and/or heard in the real world environment 100, as well as tags assigned to the audio data indicating potential sources of those real world sounds. Further, the audio library 440 can include tags assigned to the audio data indicating sounds in the VR environment that may be used to mask each of the real world sounds, depending on the theme of the VR environment 1010. The VR sound(s) indicated for each real world sound can be VR sound(s) that will serve to adequately mask the real world sound, while matching the theme of the VR environment. As noted, a wolf howl can be used to mask a dog bark, but a bird chirping may not serve such purpose very well. Thus, a tag assigned to audio data representing a dog bark can indicate a wolf howl, or another suitable sound, but probably not a bird chirp. Responsive to detecting a real world sound, the VR application 345 can sample the real world sound to generate an audio sample and, in real time, identify audio data in the audio library that most closely matches the audio sample. The VR application 345 can identify one or more tags assigned to the identified audio data to determine a VR sound that may be used to mask the real world sound, and play back the determined VR sound.

In a further example, the VR application 345 can generate other virtual objects and/or sounds to provide warnings to the user 105 to avoid getting too near the physical virtual objects. In illustration, referring to FIG. 6, assume that the physical object 150 is a fragile vase, which the VR application 345 can determine by performing image recognition on captured images of the vase contained in the sensor data. The VR application 345 can place, in the VR environment 1010, a virtual object (not shown) the user 105 may want to avoid going near, for example a rattle snake. Responsive to the user 105 moving to be within a first threshold distance of the physical object 150, the VR application 345 can generate a sound of a rattle snake's rattle, and increase the volume of that sound as the user 105 continues to move closer to the physical object 150. If the user 105 moves within a second threshold distance of the physical object 150, the VR application 345 can manipulate the image of the rattle snake to depict the rattle snake getting ready to strike, or striking. This can serve to keep the user 105 from getting too close to the physical object 150, thus reduce risk of the user accidentally bumping into the physical object 150 and perhaps causing the physical object 150 to break.

It should be noted that the above the present arrangements are not limited to the above examples. For instance, other examples of detected sounds can include, but are not limited to, sounds generated by other pets (e.g., cats, birds, etc.), sounds of dishes clanging together, sounds of automobiles, and so on. Examples of generated sounds can include, but are not limited to, sounds of other animals and wildlife (e.g., horses, cattle, bears, etc.), sounds of whips being cracked, sounds of weapons, sounds of leaves rustling, sounds of moving stage coaches, sounds of human voices with various types of accents, and so on.

In some instances, it may be desirable not to mask certain real world sounds. For example, it may be desirable not to mask spoken utterances of other people in or near the real world environment 100, spoken utterances of certain people (e.g., spouse, children, etc.), the sound of a telephone ringing, the sound of a door bell, or various types of emergency sounds (e.g., fire alarm, burglar alarm, etc.). The VR application 345 can be configured to identify such real world sounds, for example based on sampling the sounds and accessing the audio library 440 as previously described, and not mask such real world sounds. In one arrangement, whether to mask various real world sounds can be a user selectable setting in the VR application 345. In the case that only spoken utterances of certain people are to be masked, the VR application 345 can store in the audio library 440 audio samples of their voices. Responsive to detecting spoken utterances, the VR application 345 can sample the spoken utterances and compare the spoken utterances to the voice audio samples to identify who is generating the spoken utterances (e.g., using voice recognition), and access user preferences from a user profile of the user to determine whether the spoken utterances of the person generating the spoken utterances are to be masked. If not, the VR application 345 need not mask such spoken utterances. If, however, the user preferences indicate to mask such spoken utterances, the VR application 345 can mask the spoken utterances with a VR sound assigned to mask the spoken utterances.

As noted, the processes discussed above also can be applied in an AR environment.

Figure 13:
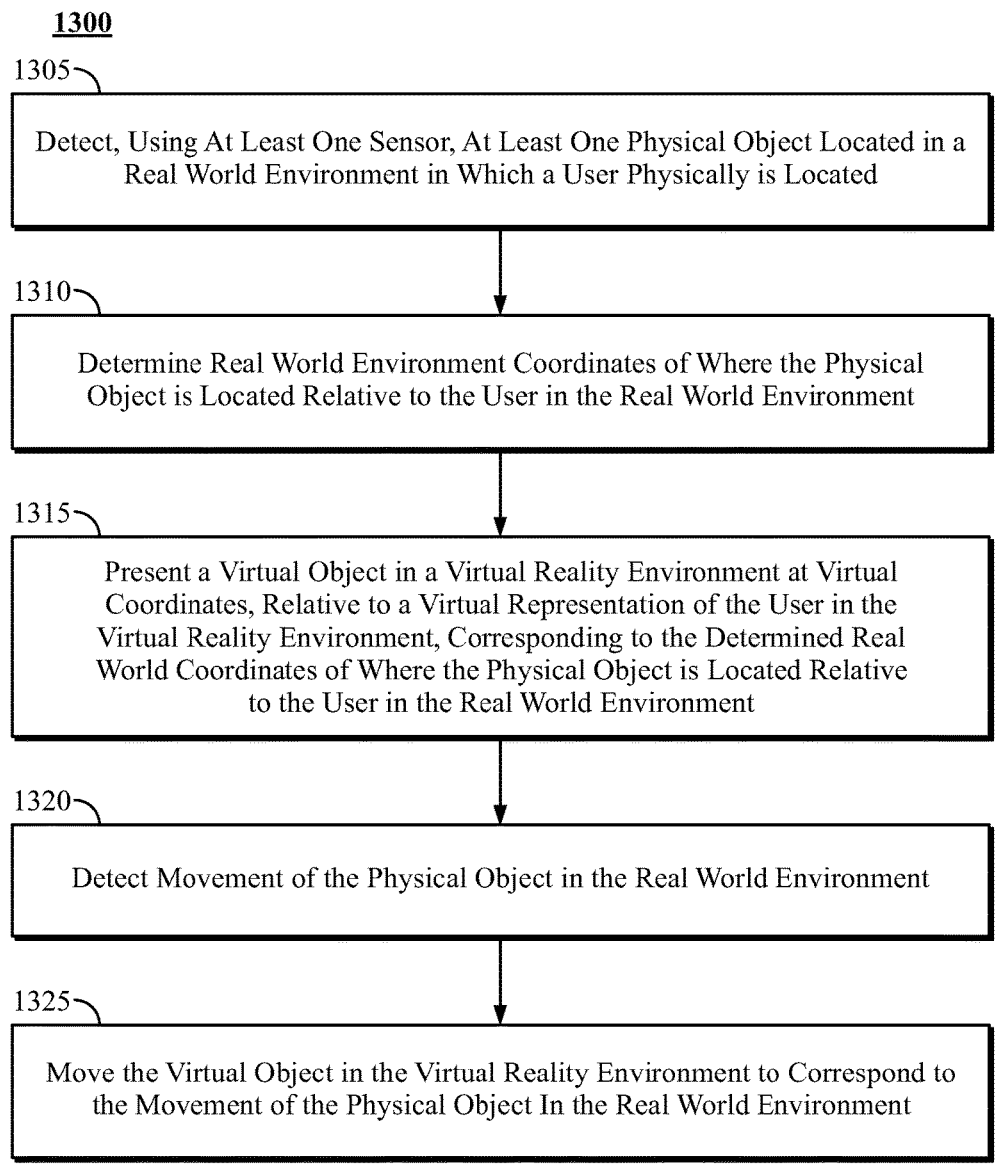
FIG. 13 is a flow chart illustrating an example of a method of presenting a virtual object in a virtual reality environment.

FIG. 13 is a flow chart illustrating an example of a method 1300 of presenting a virtual object in a VR environment. The method 1300 also can present a virtual object in an AR environment. The method 1300 can be performed while a user interacts with the VR environment or AR environment. In the following description, the method 1300 is described as being performed by the VR apparatus 110, but it will be understood by those of ordinary skill in the art that the method 1300 can be performed by an AR apparatus, the data processing system 410 or the gaming controller 420. Accordingly, the present arrangements are not limited in this regard. Moreover, those of ordinary skill in the art will appreciate that references to a virtual environment in the following description can be applied to an augmented reality environment.

At step 1305, the VR apparatus 110 can detect, using at least one sensor, at least one physical object located in a real world environment in which a user physically is located. At step 1310, the VR apparatus 110 can determine real world environment coordinates of where the physical object is located relative to the user in the real world environment. At step 1315, the VR apparatus 110 can present a virtual object in a virtual reality environment at virtual coordinates, relative to a virtual representation of the user in the virtual reality environment, corresponding to the determined real world environment coordinates of where the physical object is located relative to the user in the real world environment. The virtual object can be presented to the user for whom the real world environment coordinates are determined. For example, the virtual reality environment on at least one mobile virtual reality display viewed by the user.

As noted, the virtual coordinates of the virtual object relative to the user in the virtual reality environment can change according to changes in the real world environment coordinates of the physical object relative to the user in the real world environment. In illustration, the method 1300 further can include, at step 1320, detecting movement of the physical object in the real world environment and, at step 1325, moving the virtual object in the virtual reality environment to correspond to the movement of the physical object in the real world environment.

Moreover, the virtual object need not look like the physical object, but instead can be selected to match visual characteristics of the virtual reality environment. Nonetheless, at least one dimension of the virtual object can be selected based on at least one dimension of the physical object.

Figure 14:
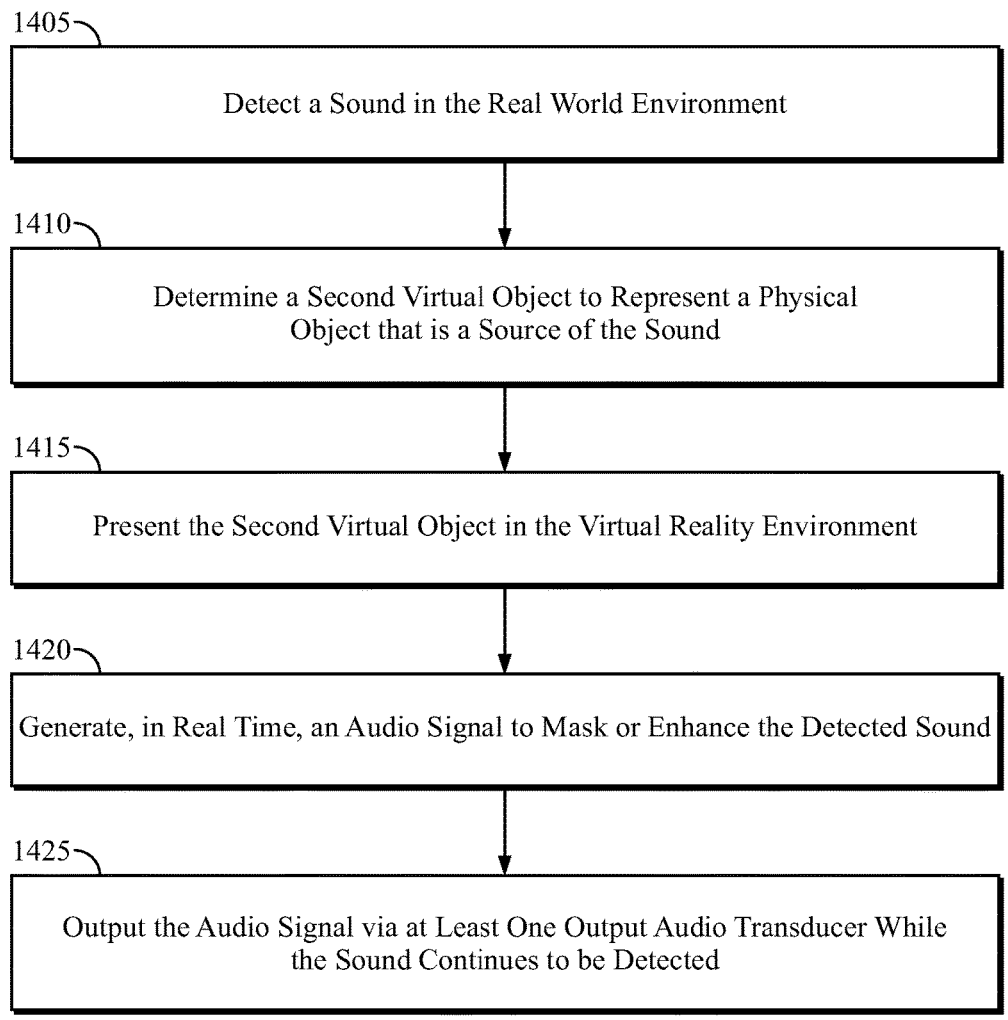
FIG. 14 is a flow chart illustrating an example of a method of presenting a sound in a virtual reality environment.

FIG. 14 is a flow chart illustrating an example of a method 1300 of presenting a sound in a virtual reality environment. The method 1300 also can present a virtual object in an AR environment. The method 1400 can be performed while the virtual reality environment is presented to a user and the user interacts with the virtual reality environment. In the following description, the method 1400 is described as being performed by the VR apparatus 110, but it will be understood by those of ordinary skill in the art that the method 1400 can be performed by an AR apparatus, the data processing system 410 or the gaming controller 420. Accordingly, the present arrangements are not limited in this regard. Moreover, those of ordinary skill in the art will appreciate that references to a virtual environment in the following description can be applied to an augmented reality environment.

At step 1405, the VR apparatus 110 can detect a sound in the real world environment. Further, the VR apparatus 110 can detect a nature of the first sound. At step 1410, the VR apparatus 110 can determine a second virtual object to represent a physical object that is a source of the sound. In illustration, the VR apparatus 1415 can select the second sound based on the nature of the first sound, and select the second sound to match a theme of the virtual reality environment. At step 1415, the VR apparatus 110 can present the second virtual object in the virtual reality environment. At step 1420, the VR apparatus 110 can generate, in real time, an audio signal to mask or enhance the detected sound. At step 1425, the VR apparatus 110 can output the audio signal via at least one output audio transducer while the sound continues to be detected. In this regard, the VR apparatus can mask the first sound by presenting the second sound to the user in the virtual reality environment.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    while a virtual reality environment is being presented to a user, detecting at least a first sound emanating from a physical object in a real world environment in which the user physically is located, wherein spatial coordinates of a spatial location of the physical object in the real world environment are moving over time;
    determining, using a processor, a nature of the first sound; and
    based on the nature of the first sound, selecting a second sound that matches a theme of the virtual reality environment and masking the first sound by presenting the second sound to the user in the virtual reality environment, the presenting the second sound comprising mimicking movement of the physical object in the real world environment by producing audio stereo imaging effects that cause the user to perceive the second sound as being emanated at the spatial location of the physical object and spatially move over time in a direction, relative to the user, the physical object is moving by selectively controlling a volume of the second sound across a plurality of audio channels.

2. The method of claim 1, wherein the selecting the second sound comprises selecting the second sound to match certain characteristics of the first sound.

3. The method of claim 1, further comprising:
    selecting a virtual object that matches the theme of the virtual reality environment to represent a source of the second sound and presenting the virtual object in the virtual reality environment at coordinates, relative to the user in the virtual reality environment, corresponding to coordinates of the physical object, which is a source of the first sound, relative to the user in the real world environment;
    wherein the virtual object moves in the virtual reality environment further mimicking movement of the physical object in the real world environment.

4. The method of claim 3, wherein the selecting the virtual object comprises selecting the virtual object to match at least one characteristic of the physical object that is the source of the first sound selected from a group consisting of a dimension, a size and a movement pattern.

5. The method of claim 3, further comprising:
    monitoring the movement of the physical object in the real world environment; and
    translating the movement of the physical object in the real world environment to movement of the virtual object in the virtual reality environment.

6. The method of claim 3, further comprising:
    determining a first distance between the user and the physical object in the real world environment;
    determining a second distance by multiplying the first distance by a scaling factor that is greater than 1 or less than 1; and
    presenting the virtual object at the determined second distance from the user in the virtual reality environment.

7. The method of claim 6, further comprising:
    translating movements of the user in the real world environment to movements of the user in the virtual reality environment that are scaled to the movements of the user in the real world environment by the scaling factor.

8. An apparatus, comprising:
    a processor programmed to initiate executable operations comprising:
    while a virtual reality environment is being presented to a user, detecting at least a first sound emanating from a physical object in a real world environment in which the user physically is located, wherein spatial coordinates of a spatial location of the physical object in the real world environment are moving over time;
    determining a nature of the first sound; and
    based on the nature of the first sound, selecting a second sound that matches a theme of the virtual reality environment and masking the first sound by presenting the second sound to the user in the virtual reality environment, the presenting the second sound comprising mimicking movement of the physical object in the real world environment by producing audio stereo imaging effects that cause the user to perceive the second sound as being emanated at the spatial location of the physical object and spatially move over time in a direction, relative to the user, the physical object is moving by selectively controlling a volume of the second sound across a plurality of audio channels.

9. The apparatus of claim 8, wherein the selecting the second sound comprises selecting the second sound to match certain characteristics of the first sound.

10. The apparatus of claim 8, the executable operations further comprising:
selecting a virtual object that matches the theme of the virtual reality environment to represent a source of the second sound and presenting the virtual object in the virtual reality environment at coordinates, relative to the user in the virtual reality environment, corresponding to coordinates of the physical object, which is a source of the first sound, relative to the user in the real world environment;
wherein the virtual object moves in the virtual reality environment further mimicking movement of the physical object in the real world environment.

11. The apparatus of claim 10, wherein the selecting the virtual object comprises selecting the virtual object to match at least one characteristic of the physical object that is the source of the first sound selected from a group consisting of a dimension, a size and a movement pattern.

12. The apparatus of claim 10, the executable operations further comprising:
monitoring the movement of the physical object in the real world environment; and
translating the movement of the physical object in the real world environment to movement of the virtual object in the virtual reality environment.

13. The apparatus of claim 10, the executable operations further comprising:
determining a first distance between the user and the physical object in the real world environment;
determining a second distance by multiplying the first distance by a scaling factor that is greater than 1 or less than 1; and
presenting the virtual object at the determined second distance from the user in the virtual reality environment.

14. The apparatus of claim 13, the executable operations further comprising:
translating movements of the user in the real world environment to movements of the user in the virtual reality environment that are scaled to the movements of the user in the real world environment by the scaling factor.

15. A computer program product, comprising:
a computer readable storage medium having program code stored thereon, the program code executable by a data processing system to initiate operations including:
while a virtual reality environment is being presented to a user, detecting at least a first sound emanating from a physical object in a real world environment in which the user physically is located, wherein spatial coordinates of a spatial location of the physical object in the real world environment are moving over time;
determining a nature of the first sound; and
based on the nature of the first sound, selecting a second sound that matches a theme of the virtual reality environment and masking the first sound by presenting the second sound to the user in the virtual reality environment, the presenting the second sound comprising mimicking movement of the physical object in the real world environment by producing audio stereo imaging effects that cause the user to perceive the second sound as being emanated at the spatial location of the physical object and spatially move over time in a direction, relative to the user, the physical object is moving by selectively controlling a volume of the second sound across a plurality of audio channels.

16. The computer program product of claim 15, wherein the selecting the second sound comprises selecting the second sound to match certain characteristics of the first sound.

17. The computer program product of claim 15, the operations further comprising:
selecting a virtual object that matches the theme of the virtual reality environment to represent a source of the second sound and presenting the virtual object in the virtual reality environment at coordinates, relative to the user in the virtual reality environment, corresponding to coordinates of the physical object, which is a source of the first sound, relative to the user in the real world environment;
wherein the virtual object moves in the virtual reality environment further mimicking movement of the physical object in the real world environment.

18. The computer program product of claim 17, wherein the selecting the virtual object comprises selecting the virtual object to match at least one characteristic of the physical object that is the source of the first sound selected from a group consisting of a dimension, a size and a movement pattern.

19. The computer program product of claim 17, the operations further comprising:
determining a first distance between the user and the physical object in the real world environment;
determining a second distance by multiplying the first distance by a scaling factor that is greater than 1 or less than 1; and
presenting the virtual object at the determined second distance from the user in the virtual reality environment.

20. The computer program product of claim 19, the operations further comprising:
translating movements of the user in the real world environment to movements of the user in the virtual reality environment that are scaled to the movements of the user in the real world environment by the scaling factor.

* * * * *